Patented Sept. 20, 1932

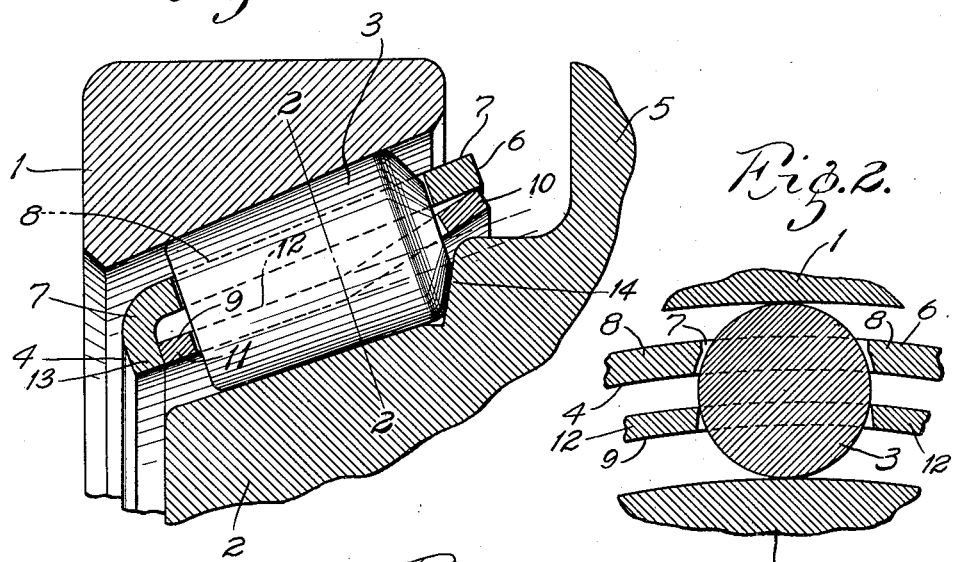
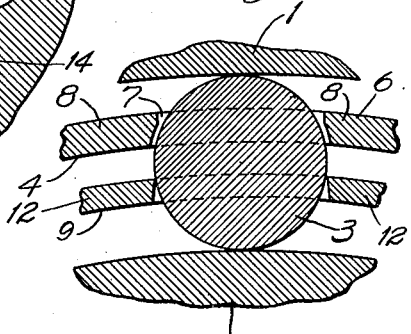
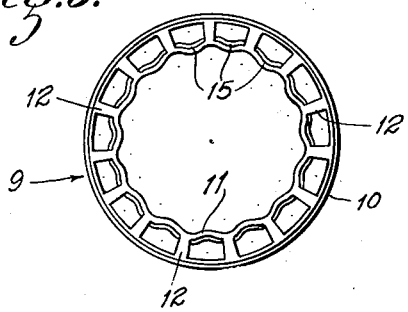
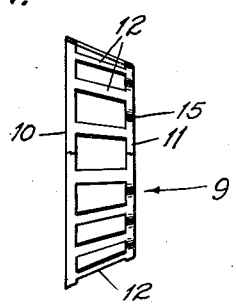
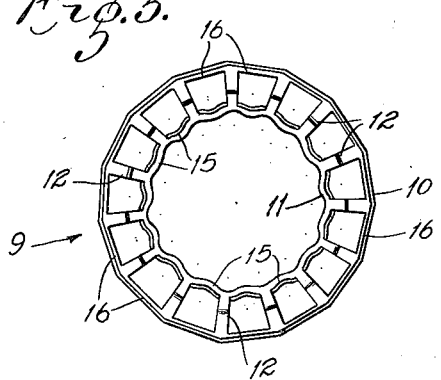
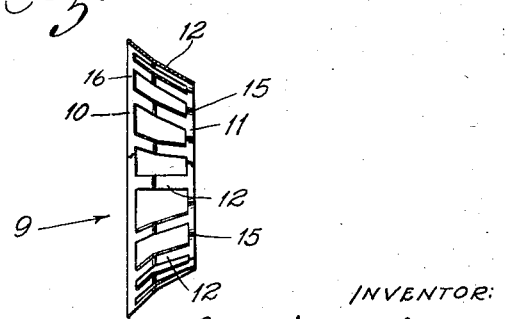

1,878,057

UNITED STATES PATENT OFFICE

ERNEST WOOLER, OF CANTON, OHIO, ASSIGNOR TO THE TIMKEN ROLLER BEARING COMPANY, OF CANTON, OHIO, A CORPORATION OF OHIO

ROLLER BEARING AND CAGE

Application filed August 1, 1930. Serial No. 472,220.

My invention relates to cages for roller bearings and has for its principal object a construction that makes of the rollers a self-contained assembly and that is particularly adapted for small bearings.

The cage is of the type embodying two shells spaced apart throughout their length, one holding the rollers against radial outward movement and the other against radial inward movement. The end rings of the cage extend across the ends of the rollers and, particularly in the case of small bearings, it has been a disadvantage of cages of this type that the end rings cover so much of the ends of the rollers as to leave an insufficient contact ring to engage the thrust rib on the bearing member. The present construction eliminates this disadvantage and at the same time provides a construction that is simple and economical to manufacture. The invention consists in the roller bearing cage and in the parts, combinations and arrangements of parts hereinafter described and claimed.

In the accompanying drawing, wherein like reference characters indicate like parts wherever they occur, Fig. 1 is a longitudinal section through a bearing and cage embodying my invention, Fig. 2 is a cross-sectional view on the line 2—2 of Fig. 1, Fig. 3 is an end view of the inner shell of the cage prior to its final shaping, Fig. 4 is a side elevation, partly in section, of said shell; and Figs. 5 and 6 are views similar to Figs. 3 and 4, respectively, showing said inner shell in its finished form.

Figs. 1 and 2 illustrate a roller bearing comprising an outer bearing member or cup 1, an inner bearing member or cone 2 and conical rollers 3 therebetween, said rollers being mounted in a double cage indicated generally by the numeral 4. The particular bearing illustrated is a bearing in which small rollers 3 are used and in which the inner bearing member may be formed integral on the end of a shaft 5. In such cases it is desirable that the rollers 3 and cage 4 form a self-contained unit.

The outer shell 6 of the cage comprises end rings 7 connected by bridges 8 that form pockets for the rollers 3 and said shell is disposed outwardly beyond the cone defined by the axes of the rollers so as to prevent the rolls from moving radially outward. The body of said shell extends substantially parallel to the bearing surface of the cup 1. The inner shell 9 likewise comprises an annular end member 10 at the large end of the rollers and an annular end ring 11 at the small end of the rollers, with connecting bridges 12 that form roller pockets. The small end ring 11 abuts against an inturned flange 13 on the small end ring 7 of the outer shell 6. The inner shell 9 is disposed inwardly of the axes of the rollers so as to prevent the rollers from moving radially inward.

As appears from Fig. 1, the small end ring 11 of the inner shell 9 is fairly close to the bearing surface of the cone 2 and the bridges 12 of the inner shell extend from said smaller end ring 11 substantially parallel to the bearing surface of the cone 2 for a portion of their length. If continued in straight lines, as shown in dotted lines in Fig. 1, the bridges 12 would terminate close to the outer periphery of the large ends of the rollers 3. In such event, only a very narrow band around the edge of each roller could contact with the thrust rib 14 of the cone and the thrust rib would have to be considerably lower than the rib shown in Fig. 1.

In order to enable the large end ring 10 of the inner shell 9 to clear the thrust rib 14, the shell is flared throughout a portion of its length. The operation is preferably performed as shown in Figs. 3 to 6. The shell blank is provided with straight conical bridges. The small end ring may be crimped between bridges, if desired, as shown at 15. The large end is then flared by any suitable tool, which results in giving the end portions 15 of the bridges a relatively sharp inclination towards the roller axes and in greatly widening the roller pockets at the end to fit the larger sections of the rollers 3, this widening being accommodated by the straightening of the annular end member between bridges to form chordal members 16 as appears in Fig. 5.

The above described construction has numerous advantages. It provides a cage that permits the ends of small rollers to have substantial contact with the thrust rib of a bearing member. It is simple and economical to manufacture; and it makes a self-contained assembly of the cage and the annular series of rollers. Obviously the cage is adapted for use with cylindrical, as well as conical, rollers and numerous changes may be made in the construction without departing from the invention; so I do not wish to be limited to the precise construction shown.

What I claim is:

1. A roller bearing cage and roller assembly comprising spaced conical inner and outer cage members each having end rings connected by bridges to form roller pockets, and conical rollers in said pockets both end rings of both cage members overlapping the ends of said rollers, the bridges of said inner shell having a greater angle near the large end thereof to bring the large end ring of the inner cage member in close proximity to the inner periphery of the large end ring of the outer cage.

2. A roller bearing cage and roller assembly comprising spaced conical inner and outer cage members each having end rings connected by bridges to form roller pockets, and conical rollers in said pockets both end rings of both cage members overlapping the ends of said rollers, the bridges of said inner shell flaring at the large end thereof to bring the large end ring of the inner cage member in close proximity to the inner periphery of the large end ring of the outer cage, said large end ring of said inner cage member being composed of chordal portions extending from bridge to bridge.

3. A roller bearing cage and roller assembly comprising spaced conical inner and outer cage members each having end rings connected by bridges to form roller pockets, and conical rollers in said pockets both end rings of both cage members overlapping the ends of said rollers, the small end ring of said outer cage member having an inturned flange overlapping the small end ring of said inner cage member, the bridges of said inner shell having a greater angle near the large end thereof to bring the large end ring of the inner cage member in close proximity to the inner periphery of the large end ring of the outer cage.

4. A roller bearing comprising a conical inner bearing member having a thrust rib at its large end, a conical outer bearing member, conical rollers therebetween with their large ends engaging said thrust rib and a cage for said rollers comprising a conical outer shell having end rings overlapping the ends of said rollers and connected by bridges, said outer shell being disposed outwardly of the cone defined by the roller axes and substantially parallel with the bearing surface of said outer bearing member, and a conical inner shell having end rings overlapping the ends of the rollers and connected by bridges, a large portion of said inner shell, beginning at the small end, being within said cone defined by the roller axes, so that a projection thereof would engage said thrust rib and the large end portion of said inner shell flaring to cause its large end ring to clear said thrust rib.

5. A roller bearing comprising a conical inner bearing member having a thrust rib at its large end, a conical outer bearing member, conical rollers therebetween with their large ends engaging said thrust rib and a cage for said rollers comprising a conical outer shell having end rings overlapping the ends of said rollers and connected by bridges, said outer shell being disposed outwardly of the cone defined by the roller axes and substantially parallel with the bearing surface of said outer bearing member, and a conical inner shell having end rings overlapping the ends of the rollers and connected by bridges, a large portion of said inner shell, beginning at the small end, being within said cone defined by the roller axes, so that a projection thereof would engage said thrust rib and the large end portion of said inner shell flaring to cause its large end ring to clear said thrust rib, said large end ring of said inner shell being composed of chordal portions extending from bridge to bridge.

Signed at Canton, Ohio, this 28 day of July, 1930.

ERNEST WOOLER.